March 14, 1961  E. E. WILLIAMS ET AL  2,974,634
ANIMAL FEEDER
Filed Oct. 8, 1957  2 Sheets-Sheet 2
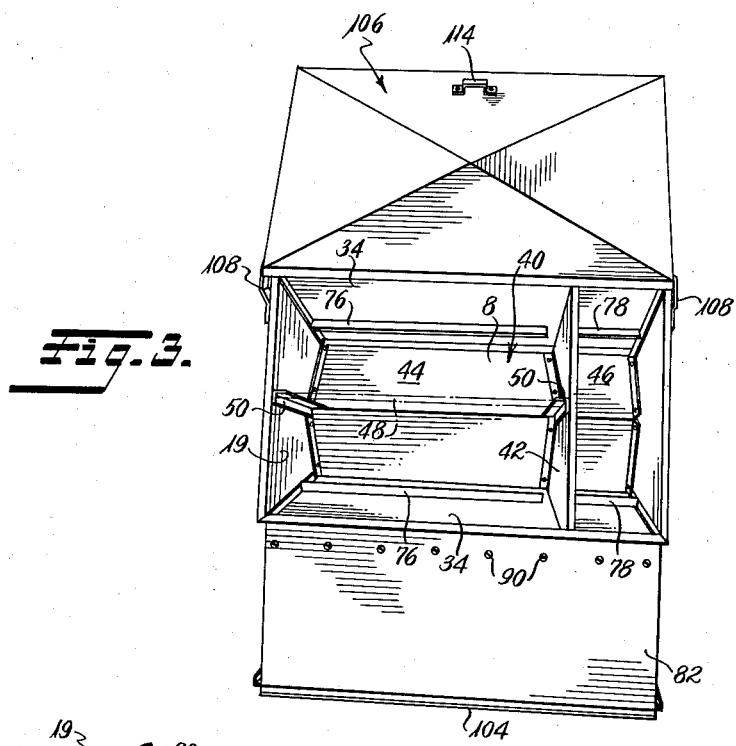
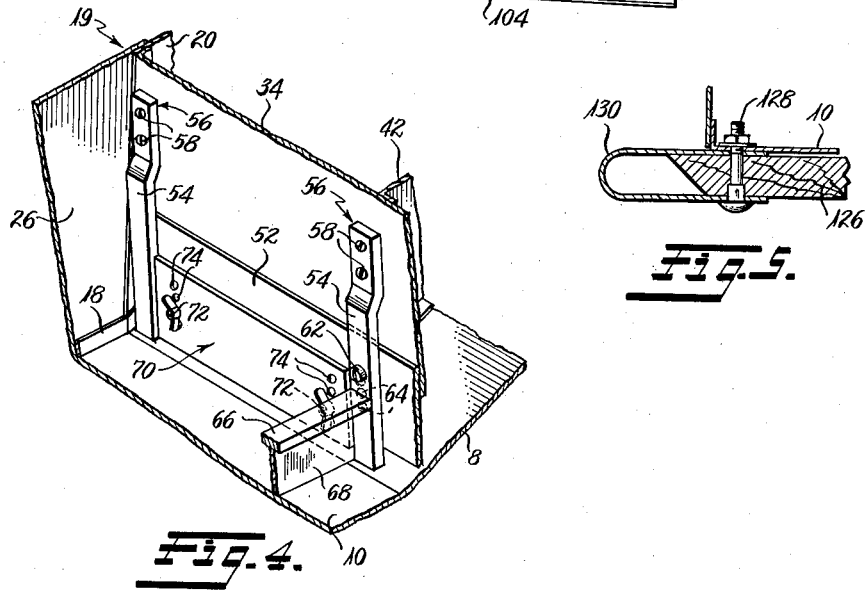
INVENTORS
Edgar E. Williams
BY Lester E. Lohman
Bacon & Thomas
ATTORNEYS ively with the horizontal portions 10 of base member 6.

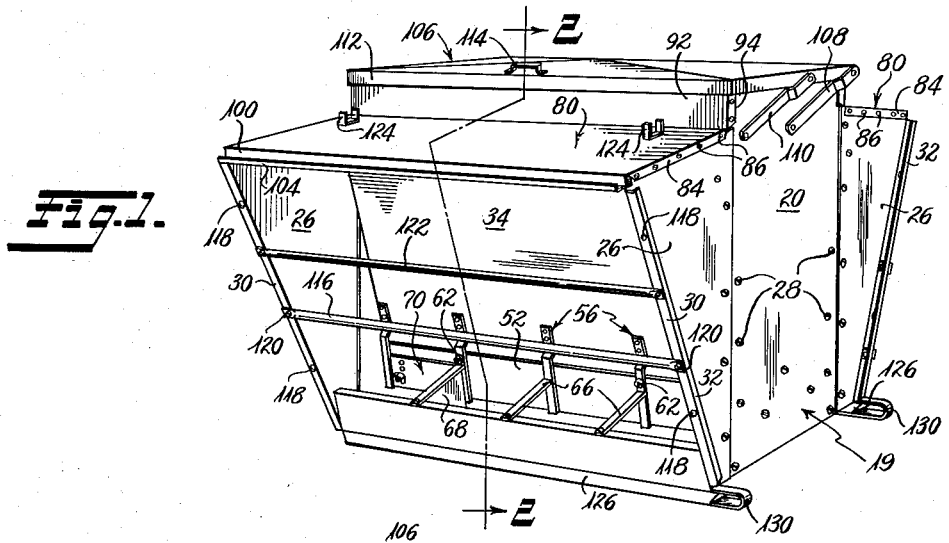

United States Patent Office 2,974,634
Patented Mar. 14, 1961

2,974,634
ANIMAL FEEDER
Edgar E. Williams, 612 S. 6th St., and Lester E. Lohman, 11 Wilmar Drive, both of Quincy, Ill.
Filed Oct. 8, 1957, Ser. No. 688,988
12 Claims. (Cl. 119—52)

The present invention relates to an animal feeder and more particularly to an animal feeder of the type in which a hopper automatically delivers the feed to a trough or troughs as it is consumed.

It is a primary object of the present invention to provide an animal feeder which is suitable for the feeding of larger animals but from which the larger animals can be excluded when it is desired that smaller animals shall feed.

It is another object of the invention to provide an animal feeder in which the delivery of varied types of feed is smoothly regulated.

It is a further object of the invention to provide an animal feeder from which more than one kind of animal feed can be dispensed at the same time.

Yet another object of the invention is to provide an animal feeder having a narrowed bottom hopper in which animal feed can be delivered from the hopper without compressing and bridging.

A still further object of the invention is to provide an animal feeder of pleasing appearance and economical construction which may be delivered in knockdown form and easily assembled by the purchaser.

Other and further objects of the invention will be apparent from the following detailed description taken in conjunction with the drawings, in which:

Fig. 1 is a perspective view of the feeder of the present invention;

Fig. 2 is an enlarged, vertical, sectional view taken on the line 2—2 of Fig. 1, looking in the direction of the arrows;

Fig. 3 is a top perspective view of the feeder with the lid of the hopper removed;

Fig. 4 is an enlarged, fragmentary view showing means for regulating the flow of finely divided animal feed from a separate compartment of the feeder; and Fig. 5 is an enlarged, fragmentary, sectional view illustrating the assembly of the tow strips and skids for moving the feeder.

Referring particularly to Fig. 2, the present animal feeder, which may conveniently be formed of sheet metal, is seen to include a base member 6, which has a raised intermediate portion 8 of inverted V-shaped configuration. On each side of the raised V-shaped portion of the base member 6 there extends a horizontal portion 10 which terminates in an upturned portion 12 to form a pair of spaced feed troughs 14. The outer edges of the upturned portions 12 are provided with inturned flanges 16 for a purpose which will be apparent hereinafter. The ends of the base member 6 are provided with a flange 18 formed at right angles thereto.

Each of the end walls 19 of the animal feeder includes an intermediate, rectangular panel 20 which is of a width closely approximating that of the inverted V-shaped portion of base member 6. The panel 20 may conveniently be attached to base member 6 by bolts 22 passing through the panel and the flange 18 of the base member 6. An inturned flange 24 is provided at the upper end of each of the panels 20, and the lower edge of the panel is preferably made co-extensive with the horizontal portions 10 of base member 6.

Each of the end walls 19 also includes a pair of wing members 26, one secured to each side of intermediate panel 20 by bolts 28 passing through overlapping portions thereof. The upper edges of wing members 26 terminate short of the upper edge of intermediate panel 20, and extend downwardly and outwardly from the panel 20 to a point substantially beyond the upturned portion 12 of base member 6. The outer edges of wing members 26 extend downwardly and inwardly, terminating substantially at the junction of horizontal portions 10 and upturned portions 12 of base member 6.

The outer edge of each wing member 26 is bent outwardly at right angles to the plane thereof to provide a flat surface 30 which terminates in an inwardly-bent flange 32 which provides added rigidity. By this construction there is provided a pair of spaced flat surfaces at opposed sides of the animal feeder for a purpose which will be set forth hereinafter.

Between the end walls 19 there are secured a pair of flat, spaced, downwardly-converging panels or side walls 34 the lower edges of which terminate considerably short of the downwardly-inclined surfaces of the inverted V-shaped portion of base member 6, with the lower edges of the panels being parallel with the apex of the V-shaped portion and substantially equally spaced therefrom. The flat panels 34 are provided with side flanges 36 for ready attachment to the respective end walls 19 of the feeder as by bolts 38 passing through the end walls and flanges 36. The panels 34 are also provided with outwardly-bent top flanges 37 for a reason which will appear hereinafter.

It will thus be seen that end walls 19 and panels 34 co-operate to form a hopper, generally designated by the numeral 40, for supplying animal feed to the feed troughs 14. As best shown in Fig. 3, the hopper is divided by a transverse partition 42 secured by any suitable means between opposed panels 34 into a relatively large compartment 44 for receiving animal feed such as grain, and a relatively small compartment 46 for receiving a finely divided feed concentrate such as that particularly suitable for the feeding of small pigs.

If desired, the larger compartment may, itself, be divided into two compartments of substantially equal size by a partition 48 shown in dotted lines in Fig. 3. This partition will extend upwardly from the apex of the inverted V-shaped portion of base member 6 and may conveniently be attached to a pair of spaced angle irons 50, one secured by suitable means to one of the end walls 19 and the other to the transverse partition 42.

Because of the varying nature and particle size of the feeds which may be fed into the feed troughs 14, it is apparent that to secure an even flow of such feeds, suitable regulating means must be provided. As illustrated particularly in Fig. 2, the regulating means may include a main valve 52, which comprises a relatively narrow rectangular panel of a length closely corresponding to the distance between opposed end walls 19. The valve 52 is mounted for relative vertical adjustment along each of the panels 34, toward and away from the corresponding one of the inclined surfaces of the inverted V-shaped portion 8 of the base member 6. For this purpose, the valve 52 is disposed between the outer surface of the panel and offset legs 54 of a series of equally-spaced brackets 56 which may conveniently be secured to the outer face of the panel 34 by means of bolts 58 passing through the panel and an attaching portion 60 of the bracket.

The valve 52 may be adjustably positioned to provide the desired clearance between its lower edge and the corresponding inclined surface of inverted V-shaped portion 8 of base member 6 by means of bolts 62 passed through aligned apertures in the offset portions 54 of spaced ones of the brackets 56 and the panel 34 to which the brackets are attached. For this purpose the valve 52 is provided with two series of vertically aligned apertures 64, one of the series of apertures being shown in dotted lines in Fig. 4. The two series are positioned and spaced so that the bolts 62 can be passed through selected ones of the apertures in each series. It will be understood, of course, that for each aperture of one series, there is an aperture in the other series in horizontal alignment therewith.

To mark off the feed troughs 14 into given areas for individual animals, bars 66 may be secured by any suitable means between the offset portions 54 of brackets 56 and flange 16 of upturned portion 12 of the base member 6. To completely isolate the portion of each feed trough in alignment with the relatively small compartment of the hopper adapted to contain a feed concentrate, a partition panel 68 is secured by any suitable means between the corresponding bar 66 and the bottom of the feed trough.

Since the feeding characteristics of the finely divided concentrate will inherently be different from that of the animal feed in the larger compartment of the hopper, it is desirable that a separate feed-regulating mechanism be provided for this portion of the hopper. For this purpose, as is best shown in Fig. 4, a valve 70 which comprises a rectangular panel of a width less than that of valve 52 and a length closely approximating the distance between partitions 68 and the adjacent end wall 19, may be mounted on the larger valve 52 for vertical adjustment with respect thereto. This may readily be accomplished by providing on the outer surface of the valve 52 a pair of spaced, horizontally-aligned studs 72 adapted to pass through selected apertures of two series of vertically-aligned apertures 74 provided in the smaller valve 70, the two series of apertures being spaced apart a distance corresponding to that between studs 72.

It has been found that with the above-described feed-supplying arrangement, compressing and bridging which will prevent proper feeding is apt to occur in the narrow bottom part of the hopper. Unexpectedly, however, we have discovered that this can be substantially prevented by providing each of the downwardly-converging panels 34 with lips 76 in the relatively large compartment of the hopper and lips 78 in the relatively small compartment of the hopper. These lips need project only a short distance into the hopper, and may conveniently be formed of angle irons and secured to the panels 34 by any suitable means.

The lips 76 and 78 will preferably be mounted a short distance above the lower edges of the panels 34 and the optimum distance for a feeder of any given size and configuration can readily be determined by experiment. For example, in a feeder having a hopper approximately 30" wide at the top and a heighth of approximately 38", it has been found that excellent results with regard to prevention of bridging and compressing are obtained if the lips are positioned about 11" above the base of the feeder.

To protect the feed troughs from the weather, canopy members generally designated by the numeral 80 are positioned thereover. The canopy members 80 include a flat, downwardly- and outwardly-inclined roof portion 82 having end flanges 84 adapted to be secured to the upper edge of wing members 26 by bolts 86 or the like. The roof portion 82 rests on the flange 37 of the panels 34 and may be secured thereagainst by means of bolts 90, as shown in Fig. 2.

Canopy members 80 also include an upright portion 92 having end flanges 94 adapted to be secured to the edge of rectangular panels 20 by means of bolts 96. The upper edge of upright portion 92 is provided with a flange 98 coplanar with the flange 24 of rectangular panels 20 and defines therewith the open mouth of the hopper 40.

The outer edge of each canopy member is provided with a downwardly-bent flange 100, an intermediate horizontal portion 102 and an upwardly-bent flange 104 to provide a U-shaped structure which acts as a rain gutter.

The open mouth of the hopper is conveniently closed by a lid 106 which is preferably mounted for swinging movement on the feeder by means of a pair of spaced hinges 108 and 110 at both sides of the feeder. The hinge 108 is preferably made slightly longer than the hinge 110, so that the lid 106 will tilt downwardly in its fully open position. The lid 106 is provided with a downwardly-turned flange 112 closely conforming to the dimensions of the upper end of the hopper, but, of course, spaced a sufficient distance at its forward edge from the wall of the hopper to provide clearance for lifting the lid by a handle 114 provided for this purpose.

As can be seen from the above description, the wing members 26 and canopy member 80 co-operate to form an open-front, protecting enclosure for the feed troughs 14 to which animals of various sizes will have ready access. It is often desirable, however, to limit the use of the feeder to smaller animals which would otherwise be prevented from feeding by the larger and stronger animals. For this purpose there is provided a guard bar 116 which is removably secured at the desired height to the spaced flat surfaces 30 provided by the flanged edges of wing members 26. To accomplish this, a series of apertures 118 (the corresponding apertures of each series being in horizontal alignment) are provided in flat surfaces 30 and bolts 120 are passed through the guard bar 116 and selected ones of the apertures.

While a single guard bar positioned at each side of the feeder will suffice in many instances to exclude larger animals which may be present, it is often desirable to employ a second guard bar 122 to prevent larger animals from feeding over the top of the lowermost guard bar.

The guard bars 116 and 122 in addition to their animal-excluding function, also have the desired effect of strengthening the feeder as a whole when they are secured in position across the open front thereof.

To store the guard bars 116, 122 when not in use, there may be provided a pair of spaced, U-shaped brackets 124 which may conveniently be secured in place by spaced ones of the bolts 90 passing through canopy member 80 and flange 37 of panel 34.

To provide portability of the present animal feeder, wooden skids 126 may be secured to the bottom of the feeder on each side. Preferably these skids will be mounted longitudinally of feed troughs 14 by means of bolts 128 extending through the skids and the bottom wall 10 of the feed trough. As shown in Fig. 5, tow strips 130 may be provided in the form of U-shaped members secured over the ends of the wooden skid 126 by means of the forwardmost of the bolts 128 securing the wooden skid to the feeder.

It will be understood that various changes may be made in the arrangement and detail of construction of the animal feeder disclosed herein without departing from the principles of the invention or the scope of the annexed claims.

We claim:

1. A sheet metal animal feeder having an open front for access of animals to a feed trough, comprising: a base portion including said feed trough; a canopy member over said feed trough; side walls secured between said canopy member and said base portion, the front edge of each of said side walls extending generally upward from a point adjacent the front edge of said feed trough and having a lateral extension to provide a pair of spaced flat surfaces; and at least one horizontal guard bar removably secured to said flat surfaces to permit animals of a selected size to feed while excluding others.

2. The animal feeder of claim 1 having connecting means between said guard bar and said flat surfaces for securing said guard bar to said flat surfaces at a plurality of selected heights.

3. The animal feeder of claim 1 in which two of said guard bars are secured to said flat surfaces in vertically spaced relation.

4. A sheet metal animal feeder having an open front for access of animals to a feed trough, comprising: a base portion including said feed trough; a canopy member over said feed trough; side walls secured between said canopy member and said base portion, said side walls having front edges extending downwardly and inwardly from said canopy member to said base portion and terminating adjacent the front edge of said feed trough, said front edges being flanged to provide a pair of spaced flat surfaces; and at least one horizontal guard bar removably secured to said flat surfaces to permit animals of a selected size to feed while excluding others.

5. The animal feeder of claim 4 having connecting means between said guard bar and said flat surfaces for securing said guard bar to said flat surfaces at a plurality of selected heights.

6. The animal feeder of claim 4 in which two of said guard bars are secured to said flat surfaces in vertically spaced relation.

7. A sheet metal animal feeder, comprising: a base portion having a feed trough formed adjacent at least one edge thereof; an upright, open-topped hopper for supplying animal feed to said trough; a canopy member extending from said hopper to a point beyond said feed trough; side walls secured between said canopy member and said base portion to form an open-front enclosure for said feed trough defined on three sides by said hopper and said side walls, said side walls having front edges flanged to provide a pair of spaced flat surfaces and extending generally upward from a point adjacent the front of said feed trough; and at least one horizontal guard bar removably secured to said flat surfaces to permit animals of a selected size to feed while excluding others.

8. The animal feeder of claim 7 having connecting means between said guard bar and said flat surfaces for securing said guard bar to said flat surfaces at a plurality of selected heights.

9. The animal feeder of claim 7 in which two of said guard bars are secured to said flat surfaces in vertically spaced relation.

10. A sheet metal animal feeder, comprising: a base member having an inverted V-shaped intermediate portion and upturned opposed edges forming a pair of feed troughs one on each side of said inverted V-shaped portion; a pair of spaced, downwardly-converging, flat panels the lower edges of which terminate short of the downwardly-inclined surfaces of the inverted V-shaped portion of said base member, said lower edges of said panels being parallel with the apex of said V-shaped portion and substantially equally spaced therefrom; a canopy member disposed above each of said feed troughs and extending beyond said upturned edges of said base member; side walls secured between said canopy members and said base member to form a pair of open-front enclosures for said feed troughs, said side walls co-operating with said downwardly-converging panels to form an open-topped hopper for supplying animal feed to each of said troughs, said side walls having outer edges flanged to provide a pair of spaced flat surfaces at each of said open fronts of said feeder extending generally upward and outward from a point adjacent the front of said feed trough; and at least one horizontal guard bar secured to said flat surfaces at each side of said animal feeder to permit animals of a selected size to feed but excluding others.

11. The animal feeder of claim 10 having connecting means between said guard bar and said flat surfaces for securing said guard bar to said flat surfaces at a plurality of selected heights.

12. The animal feeder of claim 10 in which two of said guard bars are secured to said flat surfaces in vertically spaced relation.

References Cited in the file of this patent

UNITED STATES PATENTS

| | | |
|---|---|---|
| 608,863 | Innis | Aug. 9, 1898 |
| 982,678 | Howard | Jan. 24, 1911 |
| 1,246,751 | Kaull | Nov. 13, 1917 |
| 1,936,295 | Engelke | Nov. 21, 1933 |
| 2,494,950 | Lee | Jan. 17, 1950 |
| 2,660,149 | Jolly | Nov. 24, 1953 |
| 2,797,662 | Adams | July 2, 1957 |